United States Patent
de Souza et al.

(10) Patent No.: US 10,903,672 B2
(45) Date of Patent: Jan. 26, 2021

(54) CHARGE METHOD FOR SOLID-STATE LITHIUM-BASED THIN-FILM BATTERY

(71) Applicant: International Business Machines Corporation, Armonk, NY (US)

(72) Inventors: Joel P. de Souza, Putnam Valley, NY (US); Yun Seog Lee, White Plains, NY (US); Devendra K. Sadana, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 15/474,640

(22) Filed: Mar. 30, 2017

(65) Prior Publication Data
US 2018/0287410 A1 Oct. 4, 2018

(51) Int. Cl.
*H02J 7/00* (2006.01)
*H01M 10/0562* (2010.01)
*H01M 4/36* (2006.01)
*H01M 10/0585* (2010.01)
*H01M 4/04* (2006.01)
*H01M 10/052* (2010.01)
(Continued)

(52) U.S. Cl.
CPC ......... *H02J 7/0069* (2020.01); *H01M 4/0447* (2013.01); *H01M 4/366* (2013.01); *H01M 10/052* (2013.01); *H01M 10/0562* (2013.01); *H01M 10/0585* (2013.01); *H01M 10/441* (2013.01); *H01M 4/5825* (2013.01); *H01M 10/0436* (2013.01); *H01M 10/0525* (2013.01); *H01M 2004/021* (2013.01); *H01M 2220/30* (2013.01); *H01M 2300/0068* (2013.01)

(58) Field of Classification Search
CPC ............................ H02J 7/0075; H01M 2/1094
USPC .......................................................... 320/160
See application file for complete search history.

(56) References Cited

U.S. PATENT DOCUMENTS

| | | | |
|---|---|---|---|
| 5,541,496 A * | 7/1996 | Simmonds | H02J 7/0091 320/151 |
| 5,939,217 A | 8/1999 | Tamura et al. | |

(Continued)

FOREIGN PATENT DOCUMENTS

| | | |
|---|---|---|
| DE | 102011085863 A1 | 5/2013 |
| JP | 201526555 A | 2/2015 |
| WO | 2017105234 A1 | 6/2017 |

OTHER PUBLICATIONS

Kang, B., et al., "Battery materials for ultrafast charging and discharging", Nature, Mar. 12, 2009, pp. 190-193, vol. 458.
(Continued)

*Primary Examiner* — David V Henze-Gongola
*Assistant Examiner* — Tarikh Kanem Rankine
(74) *Attorney, Agent, or Firm* — Scully, Scott, Murphy & Presser, P.C.; L. Jeffrey Kelly, Esq.

(57) ABSTRACT

A method of charging a solid-state lithium-based battery that does not include a lithium deposited anode (i.e., lithium anode-free, solid-state lithium-based battery) is provided. The method includes charging a lithium anode-free, solid-state lithium-based battery that needs to be charged utilizing at least an initial charge stage in which a charge rate of 5 C or greater is performed for a period of time of 50 seconds or less. Such charging can produce a reduced deformation of the top electrode of the lithium anode-free, solid-state lithium-based battery.

19 Claims, 3 Drawing Sheets

(51) Int. Cl.
*H01M 10/44* (2006.01)
*H01M 4/58* (2010.01)
*H01M 4/02* (2006.01)
*H01M 10/04* (2006.01)
*H01M 10/0525* (2010.01)

(56) References Cited

U.S. PATENT DOCUMENTS

| | | | |
|---|---|---|---|
| 5,994,834 A | 11/1999 | Alwan et al. | |
| 6,168,884 B1* | 1/2001 | Neudecker | H01M 4/0447 |
| | | | 429/104 |
| 6,329,789 B1 | 12/2001 | Gavrilov et al. | |
| 6,495,283 B1 | 12/2002 | Yoon et al. | |
| 6,555,945 B1* | 4/2003 | Baughman | F03G 7/005 |
| | | | 136/291 |
| 6,713,987 B2* | 3/2004 | Krasnov | H01M 4/0445 |
| | | | 320/107 |
| 7,261,979 B2 | 8/2007 | Gozdz et al. | |
| 7,583,058 B2 | 9/2009 | Iijima et al. | |
| 8,790,804 B2 | 7/2014 | Deligianni et al. | |
| 8,974,960 B2 | 3/2015 | Manthiram et al. | |
| 10,014,552 B1* | 7/2018 | Shnitser | H01M 4/1395 |
| 2001/0032666 A1 | 10/2001 | Jenson et al. | |
| 2002/0012825 A1* | 1/2002 | Sasahara | H01M 4/86 |
| | | | 429/482 |
| 2002/0071983 A1 | 6/2002 | Rowen et al. | |
| 2002/0092558 A1 | 7/2002 | Kim et al. | |
| 2003/0160589 A1* | 8/2003 | Krasnov | H01M 4/0445 |
| | | | 320/107 |
| 2003/0162094 A1* | 8/2003 | Lee | H01M 4/0421 |
| | | | 429/231.95 |
| 2003/0170519 A1* | 9/2003 | Mittelstadt | C08J 5/2218 |
| | | | 429/479 |
| 2004/0048157 A1* | 3/2004 | Neudecker | H01M 4/0421 |
| | | | 429/231.2 |
| 2006/0110661 A1* | 5/2006 | Lee | H01M 4/661 |
| | | | 429/233 |
| 2006/0278580 A1* | 12/2006 | Striemer | B01D 61/18 |
| | | | 210/650 |
| 2007/0009802 A1* | 1/2007 | Lee | H01M 4/0421 |
| | | | 429/245 |
| 2007/0134549 A1* | 6/2007 | Nathan | H01M 4/1397 |
| | | | 429/149 |
| 2007/0190413 A1* | 8/2007 | Lee | H01M 4/0471 |
| | | | 429/218.1 |
| 2008/0044732 A1* | 2/2008 | Salot | B82Y 30/00 |
| | | | 429/322 |
| 2008/0057397 A1 | 3/2008 | Skotheim et al. | |
| 2009/0246636 A1 | 10/2009 | Chiang et al. | |
| 2010/0291444 A1* | 11/2010 | Farmer | H01M 4/0404 |
| | | | 429/322 |
| 2010/0316913 A1* | 12/2010 | Klaassen | H01M 4/13 |
| | | | 429/303 |
| 2011/0076542 A1 | 3/2011 | Farmer | |
| 2011/0095720 A1 | 4/2011 | Shacklette et al. | |
| 2011/0097623 A1* | 4/2011 | Marinis, Jr. | H01M 2/0285 |
| | | | 429/163 |
| 2011/0115425 A1* | 5/2011 | Olsson | B60L 3/04 |
| | | | 320/101 |
| 2011/0281160 A1 | 11/2011 | Doi | |
| 2011/0294015 A1 | 12/2011 | Pirk et al. | |
| 2012/0052401 A1* | 3/2012 | Goodenough | C01G 33/00 |
| | | | 429/341 |
| 2012/0164539 A1* | 6/2012 | Zhamu | H01M 4/0445 |
| | | | 429/300 |
| 2013/0052489 A1* | 2/2013 | Zhamu | B82Y 30/00 |
| | | | 429/50 |
| 2013/0059204 A1* | 3/2013 | Holzapfel | H01M 4/131 |
| | | | 429/231.1 |
| 2013/0071729 A1* | 3/2013 | Klaassen | H01M 4/13 |
| | | | 429/179 |
| 2013/0089769 A1 | 4/2013 | Proctor et al. | |
| 2013/0095381 A1 | 4/2013 | Oukassi et al. | |
| 2013/0122347 A1* | 5/2013 | Horikawa | H01G 11/12 |
| | | | 429/144 |
| 2013/0130066 A1 | 5/2013 | Pytlik et al. | |
| 2013/0149593 A1 | 6/2013 | Hayashi et al. | |
| 2013/0162216 A1* | 6/2013 | Zhamu | H01G 11/06 |
| | | | 320/130 |
| 2013/0171502 A1* | 7/2013 | Chen | H01G 11/06 |
| | | | 429/149 |
| 2013/0190956 A1* | 7/2013 | Zhamu | B61C 7/04 |
| | | | 701/22 |
| 2013/0202945 A1* | 8/2013 | Zhamu | B82Y 30/00 |
| | | | 429/156 |
| 2013/0224632 A1* | 8/2013 | Roumi | H01M 2/166 |
| | | | 429/516 |
| 2013/0257352 A1* | 10/2013 | Gofman | A61B 5/14532 |
| | | | 320/107 |
| 2013/0260183 A1 | 10/2013 | Ellis-Monaghan et al. | |
| 2013/0266861 A1* | 10/2013 | Lu | H01M 4/136 |
| | | | 429/211 |
| 2013/0337305 A1* | 12/2013 | Nagai | H01M 4/505 |
| | | | 429/94 |
| 2014/0295268 A1* | 10/2014 | Wang | C22C 29/18 |
| | | | 429/218.1 |
| 2015/0084157 A1 | 3/2015 | Tegen et al. | |
| 2015/0162617 A1* | 6/2015 | Liu | H01M 4/583 |
| | | | 429/218.1 |
| 2015/0280198 A1 | 10/2015 | Weis et al. | |
| 2015/0325862 A1* | 11/2015 | Song | H01M 10/0585 |
| | | | 216/17 |
| 2016/0013462 A1* | 1/2016 | Cui | H01M 4/1395 |
| | | | 429/126 |
| 2016/0351973 A1* | 12/2016 | Albano | H01M 4/366 |
| 2017/0062829 A1* | 3/2017 | Ryu | H01M 10/052 |
| 2017/0077486 A1* | 3/2017 | Ishii | H01M 2/345 |
| 2017/0162854 A1 | 6/2017 | Sugiura | |
| 2017/0214062 A1* | 7/2017 | Song | H01M 6/005 |

OTHER PUBLICATIONS

Liu, Y. et al., "An Artificial Solid Electrolyte Interphase with High Li-Ion Conductivity, Mechanical Strength, and Flexibility for Stable Lithium", Advanced Materials, Mar. 2017, 8 pages.

Borghino, D., "New Li-ion anode achieves 70 percent charge in just two minutes", New Atlas, http://newatlas.com/quick-charge-li-ion-battery/34347/, Oct. 21, 2014, 4 pages.

Deleon, S., "Ultra Fast Charging Lithium Battery Market, power point slide presentation", Energy Ltd., http://www.sdle.co.il/AllSites/810/Assets/23%20-%20ul, Oct. 2012, 18 pages.

Tang, Y., et al., "Mechanical Force-Driven Growth of Elongated Bending TiO2-based Nanotubular Materials for Ultrafast Rechargeable Lithium Ion Batteries", Advanced Materials, Sep. 17, 2014, pp. 6111-6118, vol. 26, Issue 35.

Office Action dated Oct. 5, 2018 received in U.S. Appl. No. 15/818,405.

List of IBM Patents or Patent Applications Treated as Related Dated Nov. 5, 2018, 2 Pages.

Office Action dated Oct. 5, 2018 received in U.S. Appl. No. 15/818,385.

"Fuse", Merriam-Webster.com, Web, Aug. 9, 2018, 1 page.

Office Action dated Aug. 16, 2018 received in a related U.S. Patent Application, namely U.S. Appl. No. 15/481,042.

Office Action dated Feb. 8, 2019 received in U.S. Appl. No. 15/481,042.

Office Action dated Feb. 26, 2019 received in U.S. Appl. No. 15/818,385.

Office Action dated Feb. 28, 2019 received in U.S. Appl. No. 15/818,405.

Advisory Action dated Apr. 16, 2019 received in U.S. Appl. No. 15/481,042.

Office Action dated May 16, 2019 received in U.S. Appl. No. 15/818,286.

Office Action dated May 16, 2019 received in U.S. Appl. No. 15/818,350.

(56) References Cited

OTHER PUBLICATIONS

Office Action dated Jun. 11, 2019 received in U.S. Appl. No. 15/481,042.
Office Action dated Jun. 5, 2019 received in U.S. Appl. No. 15/818,405.
Office Action dated Jul. 10, 2019 received in U.S. Appl. No. 15/818,385.

* cited by examiner

FIG. 3
(Of the Invention)

FIG. 4
(Not of the Invention)

CHARGE METHOD FOR SOLID-STATE LITHIUM-BASED THIN-FILM BATTERY

BACKGROUND

The present application relates to solid-state thin-film batteries. More particularly, the present application relates to a method of charging solid-state lithium-based thin-film batteries that do not include an intentionally deposited lithium anode.

In recent years, there has been an increased demand for portable electronic devices such as, for example, computers, mobile phones, tracking systems, scanners, medical devices, smart watches, and fitness devices. One drawback with portable electronic devices is the need to include a power supply within the device itself. Typically, a battery is used as the power supply of such portable electronic devices. Batteries must have sufficient capacity to power the portable electronic device for at least the length that the device is being used. Sufficient battery capacity can result in a power supply that is quite heavy and/or large compared to the rest of the portable electronic device. As such, smaller sized and lighter weight power supplies with sufficient energy storage are desired. Such power supplies can be implemented in smaller and lighter weight portable electronic devices.

Another drawback of conventional batteries is that some of the batteries contain potentially flammable and toxic materials that may leak and may be subject to governmental regulations. As such, it is desired to provide an electrical power supply that is safe, solid-state and rechargeable over many charge/discharge life cycles.

One type of an energy-storage device that is small and light weight, contains non-toxic materials and that can be recharged over many charge/discharge cycles is a solid-state, lithium-based battery. Lithium-based batteries are rechargeable batteries that include two electrodes implementing lithium. Typically, lithium-based batteries include a lithiated cathode material layer and an anode region that includes lithium. In some embodiments, the anode region can be formed during a charging process. In such lithium-based batteries in which a lithium anode is not intentionally deposited, charging is typically performed at a constant charge rate lower than 3 C, wherein C is total battery capacity per hour. When a constant charge rate lower than 3 C is utilized for charging solid-state lithium-based batteries that do not contain an intentionally deposited lithium anode, large lithium islands form which may lead to stress and ultimately deformation of, and even crack formation in, the top electrode.

As such, there is a need for providing a charge method for use in charging a solid-state lithium-based battery that does not include an intentionally deposited lithium anode, which can avoid large lithium island formation and deformation of the top electrode.

SUMMARY

A method of charging a solid-state lithium-based thin-film battery that does not include an intentionally deposited lithium anode is provided. In the present application, charging may be performed on an uncharged solid-state lithium-based thin-film battery that does not include an intentionally deposited lithium anode, or a previously charged solid-state lithium-based thin-film battery that does not include an intentionally deposited lithium anode which needs to be recharged. No solid surfactants or liners are present in the solid-state lithium-based battery of the present application. During the charging process, a lithium accumulation region composed of a plurality of lithium islands is formed.

The term "solid-state" when used in conjunction with the term "battery" denotes a battery that is entirely composed of solid materials. The term "thin-film battery" is used throughout the present application to denote a battery whose thickness is 100 µm or less. The term "solid-state lithium-based thin-film battery that does not include an intentionally deposited lithium anode" may be referred to herein as a "lithium anode-free, solid-state lithium-based battery".

In one embodiment, the method may include providing a lithium anode-free, solid-state lithium-based battery that needs to be charged, wherein the lithium anode-free, solid-state lithium-based battery contains a bottom electrode, a lithiated cathode material layer located on the bottom electrode, a lithium-based solid-state electrolyte layer located on the lithiated cathode material layer, and a top electrode located on the lithiated cathode material layer. The lithium anode-free, solid-state lithium-based battery is then charged to provide lithium islands between the lithium-based solid-state electrolyte layer and the top electrode, wherein the charging includes at least an initial charge stage in which a charge rate of 5 C or greater is performed for a period of time of 50 seconds or less.

Such charging can produce a lithium accumulation region composed of a high density of uniformly distributed and sized lithium islands which provides less stress on the top electrode and which may reduce, or even eliminate, the deformation of the top electrode of the lithium anode-free, solid-state lithium-based battery.

DETAILED DESCRIPTION

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

Figure 1:
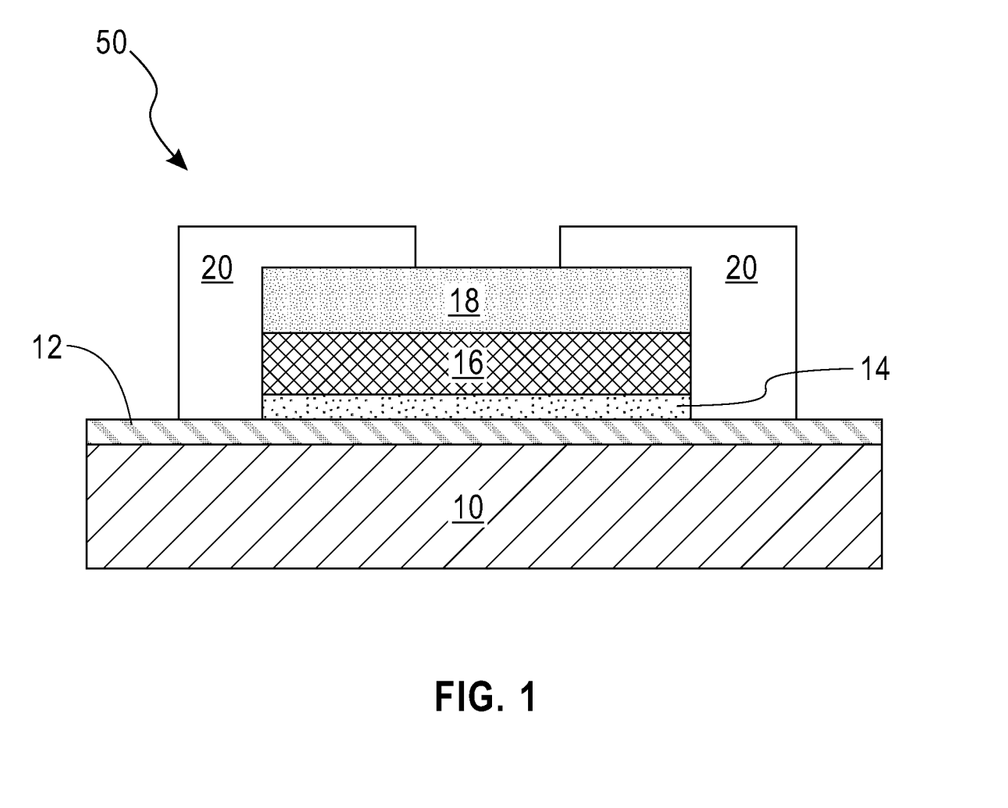
FIG. 1 is a cross sectional view of a lithium anode-free, solid-state lithium-based battery prior to charging that can be employed in accordance with an embodiment of the present application.

Referring first to FIG. 1, there is illustrated a lithium anode-free, solid-state lithium-based battery 50 prior to charging that can be employed in accordance with an embodiment of the present application. The lithium anode-free, solid-state lithium-based battery 50 that can be employed in the present application does not include any intentionally deposited lithium-containing anode, or solid surfactant or liner. Although the present application describes and illustrates patterned lithium anode-free, solid-state lithium-based battery structures, the present application can be used with non-patterned lithium anode-free, solid-state lithium-based battery structures.

The lithium anode-free, solid-state lithium-based battery 50 contains a bottom electrode 12, a lithiated cathode material layer 14 located on the bottom electrode 12, a lithium-based solid-state electrolyte layer 16 located on the lithiated cathode material layer 14, and a top electrode 18 located on the lithium-based solid-state electrolyte layer 16. In some embodiments, an air and/or moisture impermeable structure 20 is located on physically exposed surfaces of the lithium anode-free, solid-state lithium-based battery 50. The lithium anode-free, solid-state lithium-based battery 50 that can be employed in the present application is located on a surface of a substrate 10. Each of the above mentioned elements/components (i.e., 10/12/14/16/18 and 20) shown in FIG. 1 will be described in greater detail in reference to FIG. 2 below. In the illustrated embodiment, and as is shown in FIG. 1, the lithiated cathode material layer 14, the lithium-based solid-state electrolyte layer 16 and the top electrode 18 may have sidewall surfaces that are vertically aligned to each other.

Figure 2:
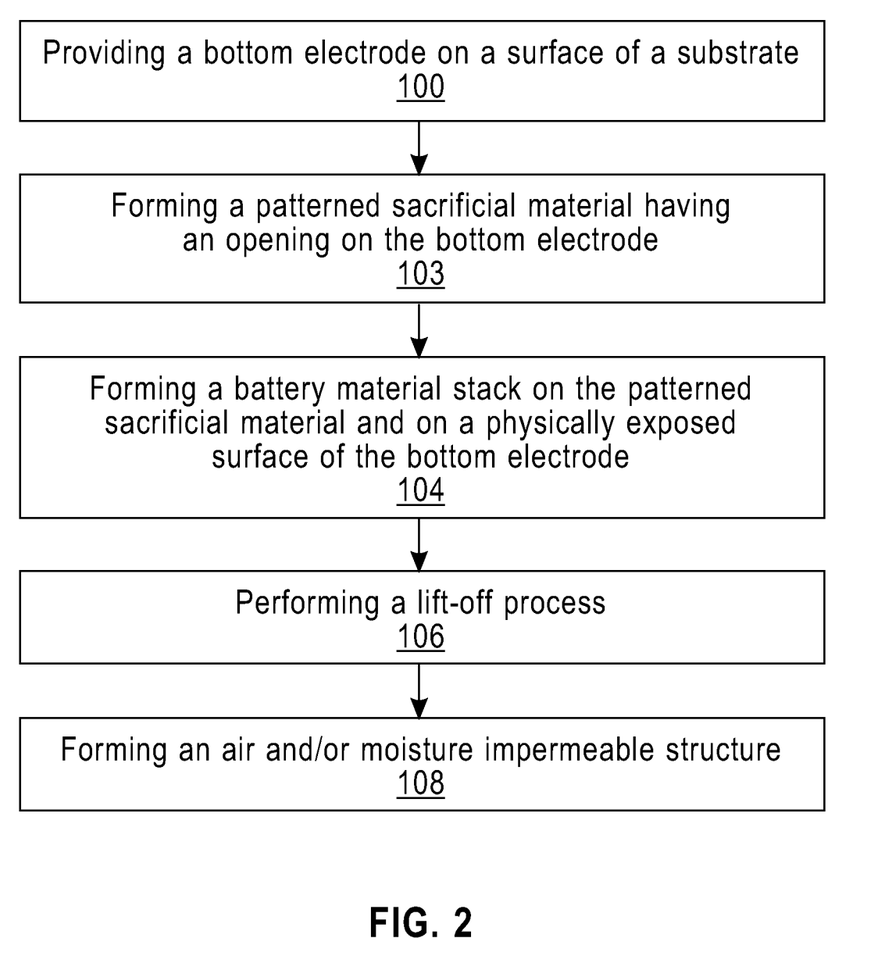
FIG. 2 is a pictorial representation of the process flow that may be employed in providing the lithium anode-free, solid-state lithium-based battery of FIG. 1 in accordance with an embodiment of the present application.

Referring now to FIG. 2, there is illustrated a pictorial representation of a process flow that may be employed in providing the lithium anode-free, solid-state lithium-based battery 50 of FIG. 1. The process flow of FIG. 2, which can be used in providing the lithium anode-free, solid-state lithium-based battery 50 of FIG. 1, includes a step 100 of forming a bottom electrode 12 on a surface of substrate 10. The bottom electrode 12 is typically a continuous layer (without any intentionally formed gaps or breaks) that is present on an entirety of the substrate 10.

The substrate 10 that can be employed in the present application includes any conventional material that is used as a substrate for a solid-state lithium-based battery. In one embodiment, the substrate 10 may include one or more semiconductor materials. The term "semiconductor material" is used throughout the present application to denote a material having semiconducting properties.

Examples of semiconductor materials that may be employed as substrate 10 include silicon (Si), germanium (Ge), silicon germanium alloys (SiGe), silicon carbide (SiC), silicon germanium carbide (SiGeC), III-V compound semiconductors or II-VI compound semiconductors. III-V compound semiconductors are materials that include at least one element from Group III of the Periodic Table of Elements and at least one element from Group V of the Periodic Table of Elements. II-VI compound semiconductors are materials that include at least one element from Group II of the Periodic Table of Elements and at least one element from Group VI of the Periodic Table of Elements.

In one embodiment, the semiconductor material that may provide substrate 10 is a bulk semiconductor substrate. By "bulk" it is meant that the substrate 10 is entirely composed of at least one semiconductor material, as defined above. In one example, the substrate 10 may be entirely composed of silicon. In some embodiments, the bulk semiconductor substrate may include a multilayered semiconductor material stack including at least two different semiconductor materials, as defined above. In one example, the multilayered semiconductor material stack may comprise, in any order, a stack of Si and a silicon germanium alloy.

In another embodiment, substrate 10 is composed of a topmost semiconductor material layer of a semiconductor-on-insulator (SOI) substrate. The SOI substrate would also include a handle substrate (not shown) including one of the above mentioned semiconductor materials, and an insulator layer (not shown) such as a buried oxide below the topmost semiconductor material layer.

In any of the embodiments mentioned above, the semiconductor material that may provide the substrate 10 may be a single crystalline semiconductor material. The semiconductor material that may provide the substrate 10 may have any of the well known crystal orientations. For example, the crystal orientation of the semiconductor material that may provide substrate 10 may be {100}, {110}, or {111}. Other crystallographic orientations besides those specifically mentioned can also be used in the present application.

In another embodiment, the substrate 10 is a metallic material such as, for example, aluminum (Al), aluminum alloy, titanium (Ti), tantalum (Ta), tungsten (W), or molybdenum (Mo).

In yet another embodiment, the substrate 10 is a dielectric material such as, for example, doped or non-doped silicate glass, silicon dioxide, or silicon nitride. In yet a further embodiment, the substrate 10 is composed of a polymer or flexible substrate material such as, for example, a polyimide, a polyether ketone (PEEK) or a transparent conductive polyester. In yet an even further embodiment, the substrate 10 may be composed of a multilayered stack of at least two of the above mentioned substrate materials, e.g., a stack of silicon and silicon dioxide.

The substrate 10 that can be used in the present application can have a thickness from 10 µm to 5 mm. Other thicknesses that are lesser than, or greater than, the aforementioned thickness values may also be used for substrate 10.

In some embodiments, the substrate 10 may have a non-textured (flat or planar) surface. The term "non-textured surface" denotes a surface that is smooth and has a surface roughness on the order of less than 100 nm root mean square as measured by profilometry. In yet another embodiment, the substrate 10 may have a textured surface. In such an embodiment, the surface roughness of the textured substrate can be in a range from 100 nm root mean square to 100 µm root mean square as also measured by profilometry. Texturing can be performed by forming a plurality of etching masks (e.g., metal, insulator, or polymer) on the surface of a non-textured substrate, etching the non-textured substrate utilizing the plurality of masks as an etch mask, and removing the etch masks from the non-textured surface of the substrate. In some embodiments, the textured surface of the substrate is composed of a plurality of pyramids. In yet another embodiment, the textured surface of the substrate is composed of a plurality of cones. In some embodiments, a plurality of metallic masks are used, which may be formed by depositing a layer of a metallic material and then performing an anneal. During the anneal, the layer of metallic material melts and balls-ups such that de-wetting of the surface of the substrate occurs.

The bottom electrode 12 may include any metallic electrode material such as, for example, titanium (Ti), platinum (Pt), nickel (Ni), aluminum (Al) or titanium nitride (TiN). In one example, the bottom electrode 12 includes a stack of, from bottom to top, titanium (Ti), platinum (Pt) and titanium (Ti). The bottom electrode 12 may be formed utilizing a deposition process including, for example, chemical vapor deposition (CVD), plasma enhanced chemical vapor deposition (PECVD), evaporation, sputtering, or plating. The bottom electrode 12 may have a thickness from 10 nm to 500 nm. Other thicknesses that are lesser than, or greater than, the aforementioned thickness values may also be used for the bottom electrode 12.

Next, and as shown in step 102 of FIG. 2, a patterned sacrificial material (not shown in any of the drawings) is formed on the surface of the bottom electrode 12, wherein the patterned sacrificial material includes an opening that physically exposes a portion of the surface of the bottom electrode 12. The opening defines an area in which the lithium anode-free, solid-state lithium-based battery 50 will be subsequently formed. Although the present application describes and illustrates a single opening, a plurality of openings can be formed in which each opening of the plurality of openings can define an area for subsequent formation of a lithium anode-free, solid-state lithium based battery.

The patterned sacrificial material utilized in step 102 of FIG. 2 can be formed by first applying a sacrificial material to the physically exposed surface of the bottom electrode 12. In one embodiment, the sacrificial material is a photoresist material. In such an embodiment, the photoresist material may be a positive-tone photoresist material, a negative-tone photoresist material or a hybrid-tone photoresist material. The sacrificial material may be formed utilizing a deposition process such as, for example, spin-on coating or blade coating, followed by a bake step to evaporate any residual solvent(s). The sacrificial material may have a thickness from 100 nm to 20 μm. Other thicknesses that are lesser than, or greater than, the aforementioned thickness values may also be used for the sacrificial material.

The deposited sacrificial material is then patterned. In one embodiment and when the sacrificial material is a photoresist material, the photoresist material may be patterned by exposing the photoresist material to a desired pattern of radiation, and thereafter the exposed photoresist material is developed utilizing a conventional resist developer to provide a patterned sacrificial material. When non-photoresist sacrificial materials are used, the non-photoresist sacrificial materials can be patterned by lithography and etching.

In another embodiment, the sacrificial material that provides the patterned sacrificial material is a shadow mask. In such an embodiment, the shadow mask may be a pre-patterned metallic material or a pre-patterned polymeric material. The pre-patterned shadow mask material is attached to the bottom electrode 12 by mechanical force or a removable adhesive.

Next, and as shown in step 104 of FIG. 2, a battery material stack is formed on the patterned sacrificial material and on the physically exposed portion of the bottom electrode 12 in the opening. The battery material stack includes, from bottom to top, a lithiated cathode material layer 14, a lithium-based solid-state electrolyte layer 16, and a top electrode 18. No intentionally deposited lithium anode, or solid surfactant or liner is formed in the battery material stack.

The lithiated cathode material layer 14 may include a lithiated material such as, for example, a lithium-based mixed oxide. Examples of lithium-based mixed oxides that may be employed as the lithiated cathode material layer 14 include, but are not limited to, lithium cobalt oxide ($LiCoO_2$), lithium nickel oxide ($LiNiO_2$), lithium manganese oxide ($LiMn_2O_4$), lithium vanadium pentoxide ($LiV_2O_5$) or lithium iron phosphate ($LiFePO_4$).

The lithiated cathode material layer 14 may be formed utilizing a deposition process such as, sputtering or plating. In one embodiment, the lithiated cathode material layer 14 is formed by sputtering utilizing any conventional precursor source material or combination of precursor source materials. In one example, a lithium precursor source material and a cobalt precursor source material are employed in forming a lithium cobalt mixed oxide. Sputtering may be performed in an admixture of an inert gas and oxygen. In such an embodiment, the oxygen content of the inert gas/oxygen admixture can be from 0.1 atomic percent to 70 atomic percent, the remainder of the admixture includes the inert gas. Examples of inert gases that may be used include argon, helium, neon, nitrogen or any combination thereof.

The lithiated cathode material layer 14 may have a thickness from 10 nm to 20 μm. Other thicknesses that are lesser than, or greater than, the aforementioned thickness values may also be used for lithiated cathode material layer 14.

The lithium-based solid-state electrolyte layer 16 includes a solid material that enables the conduction of lithium ions. Such materials may be electrically insulating or ionic conducting. Examples of materials that can be employed as the lithium-based solid-state electrolyte layer 16 include, but are not limited to, lithium phosphorus oxynitride (LiPON) or lithium phosphosilicate oxynitride (LiSiPON).

The lithium-based solid-state electrolyte layer 16 may be formed utilizing a deposition process such as, sputtering or plating. In one embodiment, the lithium-based solid-state electrolyte layer 16 of the battery material stack is formed by sputtering utilizing any conventional precursor source material. Sputtering may be performed in the presence of at least a nitrogen-containing ambient. Examples of nitrogen-containing ambients that can be employed include, but are not limited to, $N_2$, $NH_3$, $NH_4$, NO, or $NH_x$ wherein x is between 0 and 1. Mixtures of the aforementioned nitrogen-containing ambients can also be employed. In some embodiments, the nitrogen-containing ambient is used neat, i.e., non-diluted. In other embodiments, the nitrogen-containing ambient can be diluted with an inert gas such as, for example, helium (He), neon (Ne), argon (Ar) and mixtures thereof. The content of nitrogen ($N_2$) within the nitrogen-containing ambient employed is typically from 10% to 100%, with a nitrogen content within the ambient from 50% to 100% being more typical.

The lithium-based solid-state electrolyte layer 16 may have a thickness from 10 nm to 10 μm. Other thicknesses that are lesser than, or greater than, the aforementioned thickness values may also be used for the of the lithium-based solid-state electrolyte layer 16.

The top electrode 18 may include any metallic electrode material such as, for example, titanium (Ti), platinum (Pt), nickel (Ni), copper (Cu) or titanium nitride (TiN). In one example, the top electrode 18 includes a stack of, from bottom to top, nickel (Ni) and copper (Cu). In one embodiment, the metallic electrode material that provides the top electrode 18 may be the same as the metallic electrode material that provides the bottom electrode 12. In another embodiment, the metallic electrode material that provides the top electrode 18 may be different from the metallic electrode material that provides the bottom electrode 12. The top electrode 18 may be formed utilizing one of the deposition processes mentioned above for forming the bottom electrode 12. The top electrode 18 may have a thickness within the range mentioned above for the bottom electrode 12. In one embodiment, the top electrode 18 has a thickness that is greater than 200 nm.

Next, and as is shown in step 106 of FIG. 2, a lift-off process is performed in which the patterned sacrificial material and all materials (i.e., a battery material stack) formed thereon are removed from the bottom electrode 12, while maintaining the battery material stack (i.e., 14/16/18) on the bottom electrode 12. In one embodiment, the lift-off process includes removing the patterned sacrificial material utilizing a solvent or etchant that is selective for removing the sacrificial material. In one example, the solvent is a non-aqueous solvent such as, for example, acetone.

In another embodiment, the removing does not include the use of a solvent, but instead, the mechanical force is released or release occurs by peeling the patterned sacrificial material from the removable adhesive. When patterned sacrificial material is removed, the materials on the top of the patterned sacrificial material are also removed from the structure. The material stack, i.e., the battery stack material stack (14/16/18), that is present on the surface of the bottom electrode 12 remains. In the illustrated embodiment, the various material layers of the battery material stack that remains on the surface of the bottom electrode 12 have sidewall surfaces that are vertically aligned to each other.

Next, and as shown in step 108 of FIG. 2, an air and/or moisture impermeable structure 20 is formed. The air and/or moisture impermeable structure 20 includes any air and/or moisture impermeable material or multilayered stack of such materials. Examples of air and/or moisture impermeable materials that can be employed in the present application include, but are not limited to, parylene, a fluoropolymer, silicon nitride, and/or silicon dioxide. The air and/or moisture impermeable structure 20 may be formed by first depositing the air and/or moisture impermeable material and thereafter patterning the air and/or moisture impermeable material. In one embodiment, patterning may be performed by lithography and etching. The air and/or moisture impermeable structure 20 is located surrounding at least the sidewall surfaces of the battery material stack (14/16/18).

The lithium anode-free, solid-state lithium-based battery 50 shown in FIG. 1 can be made utilizing other techniques besides the process that is described above and that is illustrated in FIG. 2. For example, the lithium anode-free, solid-state lithium-based battery 50 can be formed by depositing blanket layers of the battery stack material stack (14/16/18) on the bottom electrode 12 and then subjecting the blanket deposited layers of the battery stack material stack (14/16/18) to a patterning process that may include lithography and etching. Other patterning process may also be used in the present application. In some embodiments, the lithium anode-free, solid-state lithium-based battery, which can be employed in the present application, can be formed by blanket deposition of each of the layers of the battery stack material stack (14/16/18) without any subsequent patterning process. In such an instance, each of the layers of the battery stack material stack (14/16/18), and thus the battery stack itself, would be continuously present on the bottom electrode 12. In some embodiments, a dielectric structure can be formed first on the bottom electrode 12 and then an opening can be formed into the dielectric structure to define a cavity for the battery. Thereafter, the battery stack material stack (14/16/18) is formed into the cavity on a portion of the bottom electrode utilizing a bottom-up plating process. In this embodiment, the dielectric structure may, or may not remain in the final battery structure.

The lithium anode-free, solid-state lithium-based battery 50 may be charged by connecting the lithium anode-free, solid-state lithium-based battery 50 to an external power supply with a current and voltage limiting function. The current limiting function allows charging a battery device such as the one illustrated in the present application with a predetermined constant charge rate profile throughout the entire charging cycle.

Figure 3:
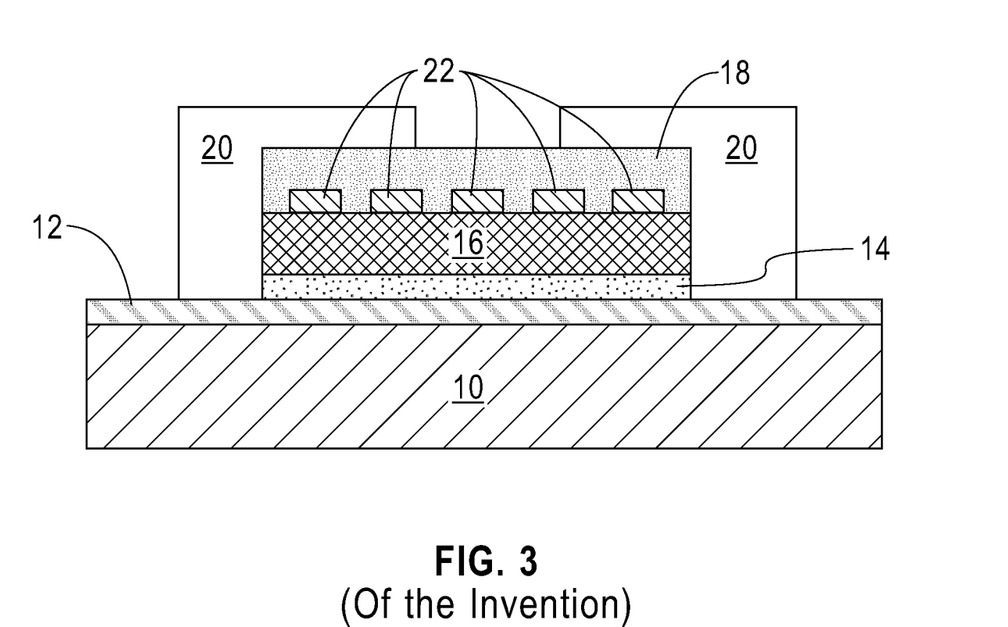
FIG. 3 is a cross sectional view of the lithium anode-free, solid-state lithium-based battery of FIG. 1 after performing a charging process in accordance with the present application.
Figure 4:
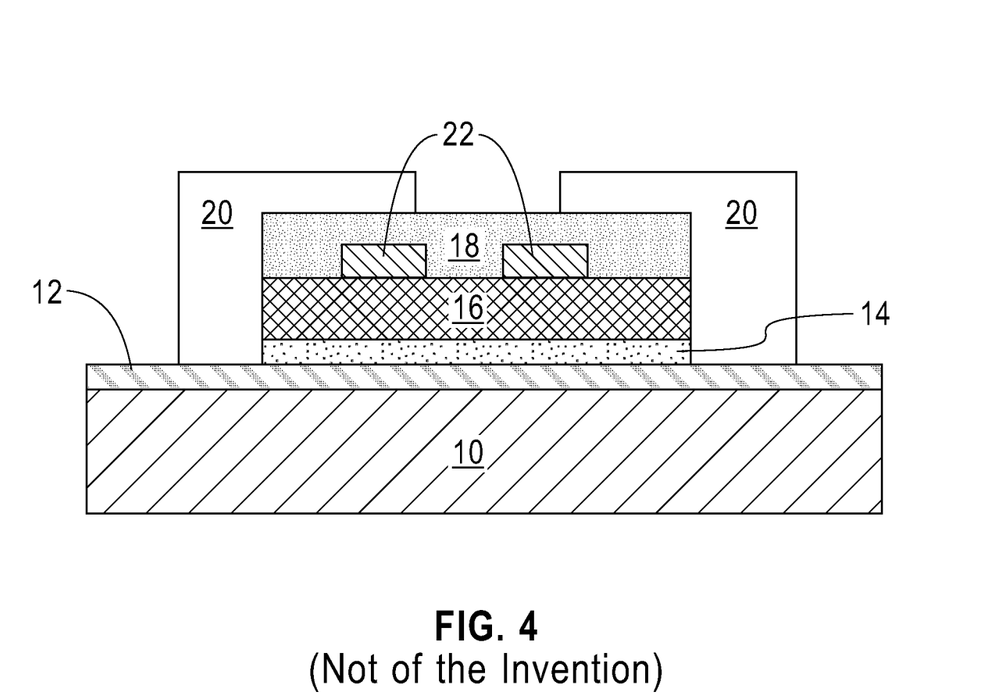
FIG. 4 is a cross sectional view of the lithium anode-free, solid-state lithium-based battery of FIG. 1 after performing a charging process not in accordance with the present application.

The charging process provides lithium islands 22 between the lithium-based solid-state electrolyte layer 16 and the top electrode 18 (See, for example FIGS. 3 and 4; wherein FIG. 3 illustrates the lithium anode-free, solid-state lithium-based battery of FIG. 1 after performing a charging process in accordance with the present application, while FIG. 4 illustrates the lithium anode-free, solid-state lithium-based battery of FIG. 1 after performing a charging process not in accordance with the present application in which a constant charge rate below 3 C is employed).

The charging process of the present application used in providing the exemplary structure shown in FIG. 3 includes a fast charging burst that is performed at least in an initial stage (or phase) of the charging process. By "fast charging burst" it is meant that the charging process of the present application includes at least an initial charge stage in which a charge rate of 5 C or greater is performed for a period of time of 50 seconds or less. In one embodiment of the present application, the charge rate of the initial charge stage of the present application is from 5 C to 200 C. In another embodiment of the present application, the initial charge stage may be performed for a period of time from 2 seconds to 50 seconds.

Such a fast charging rate may, or may not, be maintained during a further charging stage (or phase) of the present application which leads to a charged battery. In one embodiment, the further charging stage is performed after the initial charging stage and at a charge rate of 5 C or greater. In another embodiment of the present application, the further charging stage is performed after the initial charging stage and at a charge rate of 1 C or greater.

The further charging stage may or may not be performed at a constant charge rate. The further charging stage may be performed to charge/recharge the lithium anode-free, solid-state lithium-based battery 50 to any desired power level, i.e., fully charged (i.e., 100%), greater than 90% charged, greater than 80% charged, or greater than 70% charged or 60% charged or 50% charged, etc.

By utilizing a charge process that includes a fast charging burst that is performed at least in an initial stage of the charging process, Applicant unexpectedly determined that the fast charging burst of the present application lowers the propensity of forming lithium islands 22 as compared to a conventional charging process in which a constant charge rate below 3 C is used throughout the entire charging process. That is, the charging process of the present application including the fast charging burst provides more and dense lithium islands 22 which results in smaller sized islands (See, FIG. 3), while the charging process that includes constant charge rate of below 3 C provides less and sparse lithium islands 22 (See, FIG. 4) that are larger in size. The smaller sized lithium islands 22 provide a battery in which stress on the top electrode 18 is reduced and, such reduction in stress, may result in less, or even the elimination of, deformation in the top electrode 18 of the battery.

When a fast charging burst is performed at least in an initial stage of the charging process, the lithium islands 22 that are formed have a uniform distribution and size. By uniform "distribution and size" it is meant a deviation of distances between lithium islands 22 and the diameter of the lithium islands 22 are essentially the same. When charging includes a constant charge rate below 3 C throughout the entire charge process, the lithium islands 22 provide a lithium accumulation region in which the density of the lithium islands 22 is less than $10^5$ per mm$^2$. When a fast charging burst is performed at least in an initial stage of the charging process as in accordance with the present application, the lithium islands 22 provide a lithium accumulation region in which the density of the lithium islands 22 is greater than the density of lithium islands 22 created using a constant charge rate below 3 C throughout the entire charging process.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A method of charging a solid-state lithium-based battery, the method comprising:
    providing a lithium anode-free, solid-state lithium-based battery that needs to be charged, wherein the lithium anode-free, solid-state lithium-based battery contains a bottom electrode composed entirely of a metallic electrode material, a lithiated cathode material layer composed entirely of a lithium-based mixed oxide and located directly on the bottom electrode, a lithium-based solid-state electrolyte layer located directly on the lithiated cathode material layer, and a top electrode composed entirely of another metallic electrode material and located directly on the lithiated cathode material layer; and
    charging the lithium anode-free, solid-state lithium-based battery to form a lithium accumulation region composed of spaced apart lithium islands at an interface between the lithium-based solid-state electrolyte layer and the top electrode, wherein the spaced apart lithium islands are uniformly distributed and are uniformly sized, and each of the spaced apart lithium islands directly contacts a surface of the lithium-based solid-state electrolyte layer and has a density greater than $10^5$ per mm$^2$, and the charging includes at least an initial charge stage in which a charge rate of 5 C or greater is performed for a period of time of 50 seconds or less.

2. The method of claim 1, wherein the top electrode has a thickness of greater than 200 nm.

3. The method of claim 1, wherein an air and/or moisture impermeable structure is located on physically exposed surfaces of the lithium anode-free, solid-state lithium-based battery.

4. The method of claim 1, wherein the bottom electrode of the lithium anode-free, solid-state lithium-based battery is located on a non-textured surface of a substrate.

5. The method of claim 1, wherein the bottom electrode of the lithium anode-free, solid-state lithium-based battery is located on a textured surface of a substrate.

6. The method of claim 1, wherein the providing the lithium anode-free, solid-state lithium-based battery includes a lift-off process.

7. The method of claim 1, which the charge rate of the initial charge stage is from 5 C to 200 C.

8. The method of claim 1, wherein the period of time of the initial charge stage is from 2 seconds to 50 seconds.

9. The method of claim 1, wherein the lithium-based mixed oxide comprises lithium cobalt oxide (LiCoO$_2$), lithium nickel oxide (LiNiO$_2$), lithium manganese oxide (LiMn$_2$O$_4$), lithium vanadium pentoxide (LiV$_2$O$_5$) or lithium iron phosphate (LiFePO$_4$).

10. The method of claim 1, wherein the lithium-based solid-state electrolyte layer of the lithium anode-free, solid-state lithium-based battery comprises a solid material that enables conduction of lithium ions.

11. The method of claim 10, wherein the lithium-based solid-state electrolyte layer of the lithium anode-free, solid-state lithium-based battery comprises lithium phosphorus oxynitride (LiPON) or lithium phosphosilicate oxynitride (LiSiPON).

12. The method of claim 1, wherein the charging comprises a further charging stage that is performed after the initial charge stage.

13. The method of claim 12, wherein the further charging stage is performed at a constant charge rate.

14. The method of claim 12, wherein the further charging stage is performed at a non-constant charge rate.

15. The method of claim 12, wherein the further charging stage is performed at a charge rate of 5 C or greater.

16. The method of claim 12, wherein the further charging stage is performed at a charge rate of 1 C or greater.

17. The method of claim 1, wherein the lithiated cathode material layer, the lithium-based solid-state electrolyte layer and the top electrode have sidewall surfaces that are vertically aligned to each other.

18. The method of claim 1, wherein the providing the lithium anode-free, solid-state lithium-based battery comprising blanket deposition of the lithiated cathode material layer, the lithium-based solid-state electrolyte layer, and the top electrode.

19. The method of claim 1, wherein the lithium islands are entirely spaced apart from one another, and do not contact a surface of the top electrode.

* * * * *